United States Patent [19]

Pirovano

[11] 4,298,421

[45] Nov. 3, 1981

[54] DEVICE FOR APPLYING THE ELASTOMERIC FILLER TO THE BEAD CORE OF A TIRE

[75] Inventor: Dante Pirovano, Milan, Italy

[73] Assignee: Industrie Pirelli S.p.A., Milan, Italy

[21] Appl. No.: 31,299

[22] Filed: Apr. 18, 1979

[30] Foreign Application Priority Data

Apr. 19, 1978 [IT] Italy ............................. 22448 A/78

[51] Int. Cl.³ .......................................... B29H 17/32

[52] U.S. Cl. .................................. 156/460; 156/126; 156/136; 156/449; 414/226

[58] Field of Search ................... 156/123 R, 135, 136, 156/421, 422, 460, 538, 126, 131, 403

[56] References Cited

U.S. PATENT DOCUMENTS

| | | | |
|---|---|---|---|
| 2,790,481 | 4/1957 | Beckadolph et al. | 156/131 |
| 3,082,811 | 3/1963 | Borglin et al. | 156/403 |
| 3,112,237 | 11/1963 | Borglin et al. | 156/131 |
| 3,787,263 | 1/1974 | Yonekawa et al. | 156/136 |
| 3,839,115 | 10/1974 | Leblond et al. | 156/131 |
| 3,895,986 | 7/1975 | Komatsu et al. | 156/136 |
| 3,909,338 | 9/1975 | Leblond et al. | 156/422 |

*Primary Examiner*—John E. Kittle
*Attorney, Agent, or Firm*—Stevens, Davis, Miller & Mosher

[57] ABSTRACT

A device for automatically loading a bead core to an apparatus which associates an elastomeric filler with the bead core and for unloading the bead core with the filler.

The device has two jaws for loading the bead core and means for controlling the opening of the jaws. The jaws are opened when the bead core is locked in the apparatus and the jaws are moved from the apparatus towards the loading position of a new bead core.

21 Claims, 4 Drawing Figures

DEVICE FOR APPLYING THE ELASTOMERIC FILLER TO THE BEAD CORE OF A TIRE

This invention refers to improvements to devices for applying the elastomeric filler to the bead core of a tire; in particular, the invention refers to means for loading the bead core and unloading the bead core with the filler for a device (herebelow called applicator) consisting of two discs with a common axis of rotation, which can move towards or away from each other respectively along the axis in order to accommodate a bead core to which the filler strip has to be applied in any manner and with any means and to unload the core with the relative filler.

Use of the assembly consisting of the bead core with the relative filler arranged in the proximity of the bead is known in tire production for the purpose of avoiding the formation of air pockets in the portion of the casing cord plies around the bead core and to endow the bead with a specific rigidity.

Devices for applying the filler to the bead core already exist.

In accordance with a known solution, the bead core is accommodated in the cylindrical seat of a plate which rotates around its vertical axis and the filler strip is arranged on a corresponding annular supporting surface which is coaxial to the cylindrical seat of the bead core and gradually shaped into a ring by making it adhere tightly to the bead core.

Subsequently, using various techniques—mainly manual—forces are applied to weld the edges of the strip.

This solution has the disadvantage of low productivity because of the multiplicity of manual operations required, i.e. the application of the said forces to the edge of the strip, the various stages involved in feeding the strip, centering the bead core on the rotating plate, loading and unloading the bead core with or without the filler.

There are also certain solutions with specific automatic processes to increase productivity.

The use is known, for example, of applicators substantially consisting of two rotating elements having a common axis of rotation, a seat to accommodate the bead core between the two said elements, and mechanical means for attaching the filler to the bead core.

When the two rotating elements have been moved away from each other along their common axis of rotation, it is possible to unload the bead core with the filler manually or to introduce it and to center the bead core on an appropriate seat in either element manually and when they are brought together and made to rotate, they bring about the application of the filler onto the periphery of the bead core clamped between the two elements.

The said elements can have different shapes, e.g., here and further on in the description it is possible to mean two discs, or a flange and a disc, or even a bell and a drum.

One of these known solutions is that described in U.S. patent application Ser. No. 959,338, also in the name of the applicant.

In this case, a filler strip, cut to a length equal to the peripheral development of the bead core already introduced manually between the two discs, previously moved away from each other, is applied automatically to the rotating bead core.

Subsequently, suitable means weld together the opposite, open ends of the filler strip adhering to the periphery of the bead core.

This solution eliminates the problem of a manual application of forces to the edges or opposite ends of the filler strip and very much assists the continuous feed of a strip of filler to the applicator, resulting in a high quality final product as amply described in the said text of the applicant.

However, present day technology demands even greater productivity, which can only be achieved with the complete automation of the phases involved in the complete production cycle of the component in question.

Therefore, in this connection, not only the phases of welding the filler on the bead core, already automated in an optimum way with the aforesaid solution, become important, but, similarly, also the phases of loading and unloading the bead core with the filler.

The solution to be achieved is not as simple as it may be thought at first sight because the problems to be solved are many and varied.

The first problem to be solved derives from the geometrical conformation of the bead core.

The bead core has a small area cross section and defines an internal empty space with the result that in offering little resistance to external forces, it is subject to deformation and ovalisation.

In this case, it is easy to understand how excessive deformation values, caused, for example, by the application of high mechanical forces on the periphery of the bead core in order to obtain a good grip, could hinder exact automatic centering of the bead core between the discs of the applicator.

Therefore, the solution chosen must guarantee the integrity of the original shape of the bead core, similar to that already achieved manually, but with higher costs and a skilled operator.

It must also be borne in mind that the applicators are machines of a rather limited height and horizontal development and that they have to allow numerous tubes and mechanism for the fluids and the necessary work cycles to achieve a very high level of automation, to be fitted within an extremely limited space.

Therefore, the problem of introducing a device for loading and unloading the bead core in the situation described cannot be solved in natural way at all.

In addition, this loading device would have to pick up the bead core from a certain loading position and then secure it adequately to ensure that it cannot move during transport between the discs of the applicator.

The loading device would have to remain in this position until the two discs which have come together lock the bead core in the relative seat.

Therefore, at this point, the bead core would be attached both to the discs and to the loading device so that taking this double attachment into account, the removal of the latter in order to load a new bead core certainly does not appear to be simple.

Unfortunately, up to now, there is no known solution which makes it possible to solve all the disadvantages and problems mentioned here at the same time.

Therefore, the aim of this invention is a device for applying an elastomeric filler to the bead core of a tire, having the necessary improvements to completely automate and increase the productivity relating to the said component of the tire.

The subject of the present invention is a device for applying an elastomeric filler on the bead core of a tyre, consisting of two discs with a common axis of rotation, which can be moved away from each other or brought together respectively to receive the bead core before the application of the filler and to unload the bead core with the filler and to form an annular seat designed to accommodate the bead core, the said device being characterised by the fact that it includes means for automatically loading the bead core from a first position to a second position in which the bead core is between the two discs with its center aligned with the common axis of rotation, the said means having two jaws and means for controlling the opening of the jaws, the said two jaws rotating in relation to each other round a first hinge arranged on a suitable support rotating around a second hinge in order to bring the jaws from the first of the said positions to the second and vice versa, the said two hinges having axes of rotation parallel to the common axis of rotation of the two discs, the profile of the jaws when closed having surfaces corresponding to circle arcs of the radial profile of the bead core, the said surfaces of the jaws being provided with means for connecting to the corresponding parts of the radially outermost periphery of the bead core, the said means for controlling the opening of the jaws being actuated when the bead core had already been locked in the annular seat between the two discs and the support is moved from the second of these positions to the first, the said means for controlling the opening of the jaws having an element for controlling the rotation of the first jaw, the path of which from the second of these positions to the first meets the external profile of the bead core, the said first jaw rotating around the first hinge and in relation to the second jaw kept stationary on the said support.

Basically, the solution now described consists of two jaws with a profile corresponding to successive arcs of the bead core, with means designed to secure the bead core during transport up to and between the discs of the applicator, duly moved apart, and with means designed for controlling the opening of one jaw.

Therefore, in the loading position, the profile of the jaws holds the bead core along a complete arc which is considered to be the most certain to guarantee a good grip up to the position of centering and locking between the discs.

From this point onwards, the removal of the loading means from the discs of the applicator takes place in any case and in relation to any jaw profile.

In fact, the jaw which rests on the bead core, the return path of which towards the home position would be impeded by the presence of the bead core between the discs, is made to rotate in relation to the other jaw by means of a suitable element, thereby allowing the loading means to be freely removed.

In the preferred solution, the characteristic element of the means for regulating the opening of the jaws is elastic and keeps the profile of the first jaw in sprung contact with the bead core during the movement of the jaw support from the second of the said positions to the first.

By the term "elastic element" used below, is meant any spring, of any shape and size, fitted to the jaw in order to apply a force to equilibrate any force tending to make one jaw rotate in relation to the other.

This characteristic has the advantage of bringing back the two jaws into a suitable position for loading a new bead core, completely automatically.

The present invention will now be more clearly understood from the following detailed description, given as an example, with reference to the diagrams in the enclosed sheets of drawings in which.

The applicator 1 (FIG. 1) described here carries out, automatically and continuously, the complete production cycle for the tire component consisting of bead core 2 and relative filler 3, from the stages of feeding the filler and the bead core up to those of securing the filler on the bead core and unloading the complete component.

Figure 2:
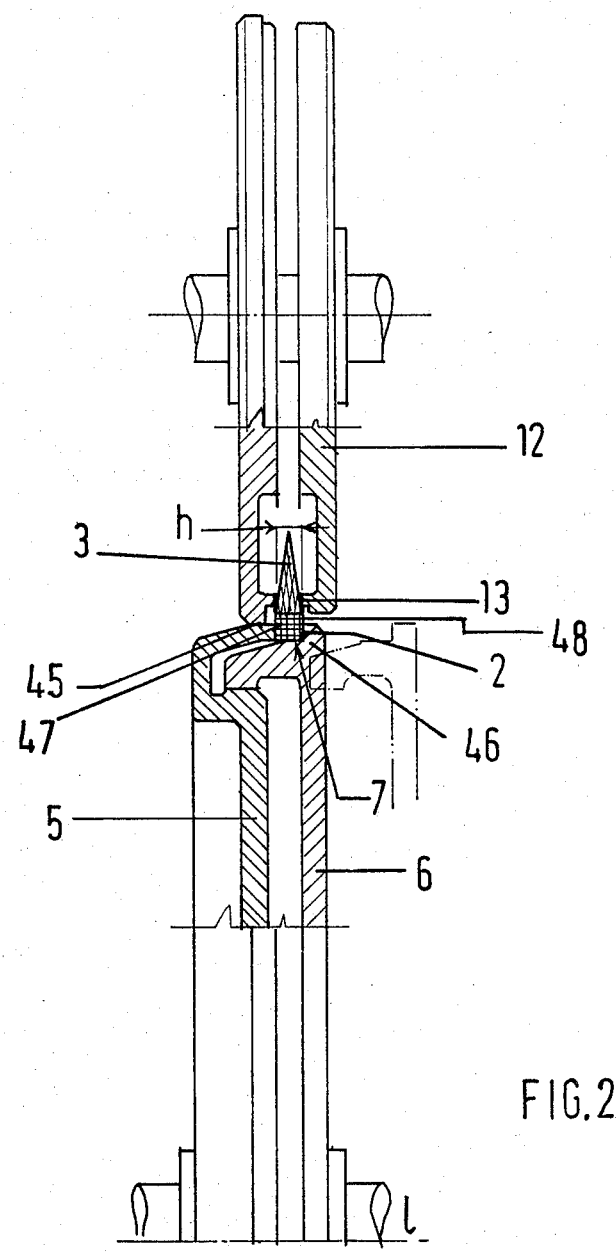
FIG. 2 illustrates a partial section of the bead core with the relative filler in the annular seat of the two discs of the applicator.

In all, the applicator 1 has a device 4 with two rotating discs 5 and 6 between which bead core 2 is accommodated in an appropriate annular seat 7 as illustrated in detail in FIG. 2, means 8 for automatically loading the bead core from a first position A to a second position B in which the bead core is between the two discs, removed from each other along the common axis of rotation 1, a first transport system 9 of a plurality of bead cores 2 with the relative fillers 3.

In addition to the said discs 6 and 7, the device 4 also has further parts designed to bring about the adhesion of the filler on the bead core and to join the ends of the filler; it is pointed out here, as an example, that the said further parts can be those described in U.S. patent application Ser. No. 959,338 of the applicant.

Therefore, in order to sum up briefly below that which is described in detail in the other text, the device 4 has a frame 11 (FIG. 1) to which the two discs 6 and 7, with horizontal axis of rotation 1, are attached, a drum 12, within which a strip of filler slides in a suitable annular groove 13 (see FIG. 2), a device (not illustrated) to cut the strip of filler to a length equal to the peripheral development of the bead core, means 14 (see FIG. 1) to lock and connect together the two open, V-shaped ends of filler 3, already applied to bead core 2 by drum 12.

Figure 4:
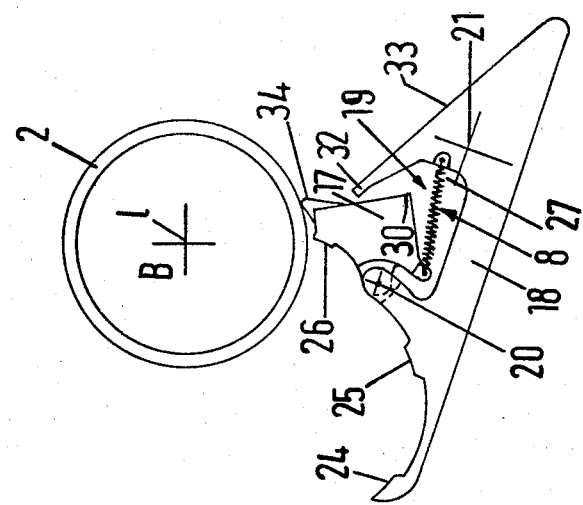
FIG. 4 shows the means for loading the bead core in the stage of removal from the discs in FIG. 2 and at a stage subsequent to that illustrated in FIG. 3.
Figure 3:
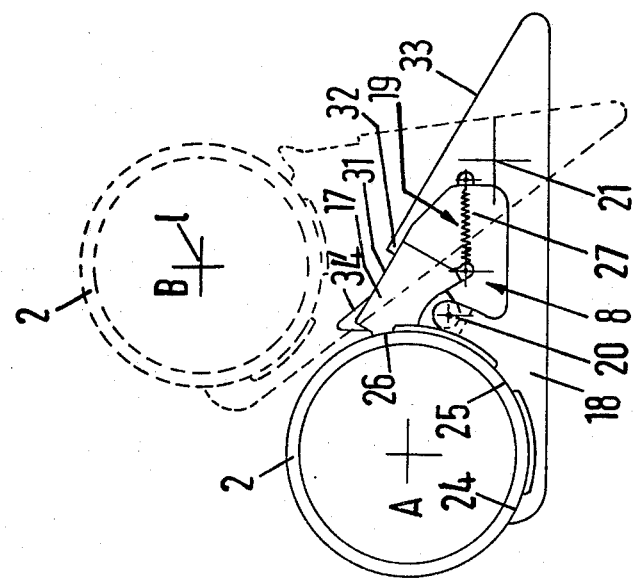
FIG. 3 shows the means for loading the bead core with solid lines and the same means in the position for loading the bead core between the discs of FIG. 2, with broken lines.

The means 8 for automatically loading bead core 2 consist (FIGS. 1 and 3) of two jaws 17 and 18 and means 19 for regulating the opening of the jaws (FIG. 4).

The jaws 17 and 18, referred to below as the first and second jaw respectively, can rotate in relation to each other around a first hinge 20, with axis of rotation parallel to axis 1 of the two discs 5 and 6 and both the jaws can be moved from position A to position B in FIG. 1, being arranged on a support which pivots around a second hinge 21, aligned with the first hinge 20 and the center of the bead core between the jaws; preferably, the support is constituted by the same second jaw 18, the extension 22 of which is made to rotate around the second hinge 21 by means of fluid dynamic control 23.

The profile of jaws 17 and 18, when closed, has three surfaces 24, 25 and 26 (FIG. 1), the median lines of which correspond to circle arcs of the radial profile of the bead core along a complete arc of less than or at the most equal to 180°; each surface 24, 25, 26 is provided with means for connecting to the corresponding parts of the bead core.

In the preferred embodiment, each surface 24, 25, 26 of the jaws has, as means of attachment, magnets which are able to apply magnetic attraction to the iron parts of the bead core and thereby attach the bead core to the jaws with the necessary force.

The means 19 for regulating the opening of the jaws consists of a helicoidal spring 27 fitted between two points 28 and 29 which are integral with the extensions 22 and 22' respectively of the two jaws.

Spring 27 is fitted at a certain distance from the first hinge 20 in order to create a torque which elastically opposes the opening of the jaws.

On the other hand, without the bead core between the jaws this spring would tend to close the jaws up to a point which would prevent the bead core being loaded at the right moment.

Figure 1:
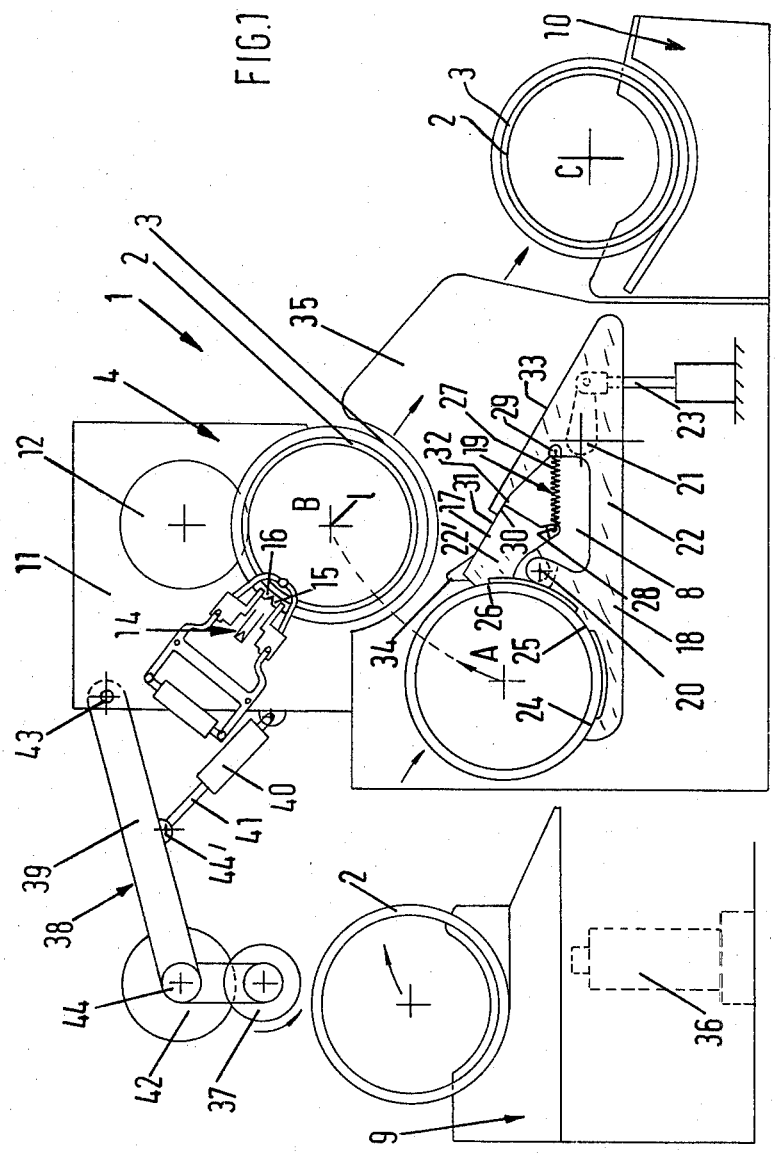
FIG. 1 illustrates a view of the applicator assembly.

In order to overcome this problem, a part 30 of the upper surface 31 of the first jaw abuts on a corresponding shoulder 32 of the second jaw; with the configuration described, clearly illustrated in FIG. 1, shoulder 32 prevents the complete rotation of jaw 17, with the action of spring 27 and in the absence of the bead core.

In the preferred embodiment, the two jaws with respective external upper surfaces 31 and 33 form, in position A of FIG. 1, an inclined surface on which bead core 2 with filler 3 slides when the two discs 5 and 6 are removed from each other.

In order to assist the movement of the filler with the bead core from discs 5 and 6 towards the position C of FIG. 1, the initial section of the said inclined surface has a suitable take-up profile 34.

The solution just described has proved advantageous.

In fact, the applicator has a single loading and unloading device and this circumstance makes the applicator easier and less expensive to make.

In particular, the applicator in accordance with the invention has the further characteristic of being able to function with the center plane between the discs in an unchanged position in relation to the jaws both during the phases of loading and unloading the bead core.

In other words, the center plane between the discs, the plane for loading the bead core from position A to position B, and the plane for unloading the bead core with the filler, coincide.

Therefore, any movement of the jaws in a vertical direction to the plane of FIG. 1 is excluded.

The result is a compact applicator which can therefore be easily installed in any area where other work on other tire components is carried out.

In order to make the unloading of the bead core with the filler a more secure operation, the applicator also has two guide and containing walls within which the jaws are contained both in the position A and B of FIG. 1 and during the transfer of the bead core from A to B.

Preferably, and particularly in the case of bead core having a rectangular section of 6×6 mm, for example, each edge of the jaws is less than 4 mm away from the relative wall 35 (FIG. 1).

Therefore, in the example indicated, the channel within which the jaws move has a total width of 14 mm.

As already said, the applicator 1 has a first and second transport system, 9 and 10, to feed the bead cores and to remove the bead cores with the relative fillers.

The first system has a series of compartments, each accomodating one bead core, thereby forming a row of bead cores with the centres aligned in the direction parallel with axis 1 of the discs 5 and 6, moved simultaneously by a single mechanism.

The second system is constructed in the same way.

The first system also includes means for distributing the bead cores towards the two jaws arranged in position A of FIG. 1.

These means have for example, a fluid dynamic control 36, the piston of which is actuated in order to apply a thrust to the bead core above in order to move it from the compartment in which it is contained, towards jaws 17 and 18.

Alternatively, the means of distribution have a roller 37, mounted to rotate round an axis parallel to the axis of alignment of the centers of the bead cores and a device 38 to bring the rotating roller 37 in contact with the periphery of the bead core underneath.

The said device has a lever 39, a cylinder 40 and a relative piston 41, a power unit 42.

The lever has one end 43 hinge mounted on frame 11, a second end 44 connected to power unit 42 and intermediate point 44' connected to piston 41, the cylinder 40 of which has its own casing hinge mounted on the frame.

The applicator also has means (not illustrated) of any known type, electronic or electromechanical, to move and stop the transport systems 9 and 10 in the predetermined positions to unload or load the bead core and the bead core with the filler.

The function of the applicator will now be described starting with the situation illustrated in FIG. 1, i.e. with the various parts of the applicator 1 in the following stages:

the transport system 10, having received a first bead core 2 with relative filler 3, moves by one compartment from the unloading position C towards a corresponding pick up station. System 10 waits in the new position until it receives a second bead core with the relative filler.

The second bead core 2, accommodated in annular seat 7 (FIG. 2) between the discs 5 and 6 has already had the filler applied; this filler, having been obtained by cutting an elastomeric strip perpendicularly to the direction of feed and to a length equal to the peripheral development of the bead core, has V-shaped, open opposite ends 15 and 16 (FIG. 1). Therefore, in FIG. 1 the device 4 is illustrated at the stage prior to welding the ends of the filler together.

The two jaws 17 and 18, in loading position A, have already received a third bead core 2 from transport system 9.

The first transport system 9 is stationary and the central plane of the fourth bead core, in the corresponding compartment, is aligned with the loading plane of the jaws.

The following stages take place from this point on:

the device 4, with suitable means for locking the opposite sides of the filler in the zone near to each and with further suitable connecting means, indicated generically by reference 14, joins the ends 15 and 16 of the filler strip together. This stage is amply described in the text of the U.S. patent application Ser. No. 959,338 and is not repeated again for the sake of simplicity.

Subsequently, the two discs 5 and 6 are moved away from each other along common axis of rotation 1 in order to drop the "second bead core filler" assembly between the guide and containing walls 35 (FIG. 1), towards the inclined surface below defined by external surfaces 31, 33 of the two jaws 17 and 18. During this movement, one part of the periphery of the filler is initially in contact with the take-up profile 34, which rolls it towards the empty compartment of the second transport system 10 in unloading position C; in this position, the second bead core with the filler is integral with the transport system 10.

Then, fluid dynamic control 23, operated in accordance with a predetermined sequence, causes the two jaws 17, 18 and third bead core to rotate from position A to position B in the center plane between discs 5 and 6. The angular movement of the two jaws around the second hinge 21 is blocked when the center of the third bead core is aligned with the common axis of rotation 1 between the two discs, i.e. in the position traced in FIG. 3. In this position (B) the third bead core is maintained in the center plane of the two discs by the presence of the magnets on the profiles of the jaws.

Immediately afterwards, the two discs 5 and 6 (FIG. 2) are brought towards each other until the opposite front annular surfaces 45 and 46 (FIG. 2) are in contact with opposite sides 47 and 48 of bead core 2. Simultaneously at this point, the third bead core 2 is locked laterally by the discs and on the radially outermost development by jaws 17 and 18 by means of a magnet.

At a further stage, the fluid dynamic control 23 operates in the opposite direction to the previous stage, i.e. it brings about the angular movement of the two jaws 17 and 18 from position B towards position A (FIG. 4) around hinge 21. During this stage, the external profile of the third bead core 2 locked between the two discs 5 and 6 meets the circular path followed by the surface of the contact profile of the first jaw 17. Still during the same stage, all the points of the profile of the second jaw in contact with the bead core in position B follow circular paths around second hinge 21 without meeting any obstacle. This free movement of the second jaw from B to A is due to the fact that the outermost point of its profile in contact with the bead core is very near to the first hinge 20 and as this is aligned with the centre of the bead core between the jaws and the second hinge 21, it is obliged without any doubt to follow a free circular path. Therefore, a force is only applied to the first jaw which tends to bring about a rotation round the first hinge 20, with consequent variation of the original profiles of the jaws, which contrast spring 27 opposes with a torque. With regard to the choice of the elastic characteristics of the spring and of its distance in relation to the first hinge 20, the torque is such that some points of the profile of the first jaw are kept in contact with the periphery of the third bead core. When the path of all the points of first jaw 17 does not meet the profile of the third bead core, the torque produced by spring 27 brings about a rotation of first jaw 17 around hinge 20 in an opposite direction to the previous one until part 30 of external surface 31 of first jaw 17 abuts on shoulder 32 of the second jaw 18 (see FIGS. 1 and 4). At this point, the loading profile of the jaws is fully reconstituted and in that state it arrives at loading position A for a new fourth bead core. During the movement of the loading means from B to A, no ancillary equipment of any kind is included to facilitate the return of the jaws to the original position. In fact, in accordance with the inventive principle of the present application, the presence of the bead core between discs 5 and 6 automatically brings about the opening of the jaws and spring 27 automatically brings about the closing of the jaws back to the original position. Therefore, it is evident how the solution in accordance with the invention makes it possible to accommodate all the necessary equipment for automatically loading and unloading the bead core and the bead core with the relative filler between two walls which are separated by little more than the width of the bead core.

Device 4 is then operated to apply a new filler to the third bead core accomodated between discs 5 and 6 which are made to rotate. At the same time as the application of the filler to the third bead core, a further bead core is transported between the two jaws in position A. In order to do this, piston 41 is operated by lowering lever 39 and bringing the periphery of roller 37, already in rotation, in contact with the periphery of the fourth bead core accomodated in a compartment of transport system 9. Because of the friction between the two contact surfaces, the bead core is pushed towards the two jaws 17 and 18 and it remains in this position until the new loading stage in the direction of discs 5 and 6.

The invention has the fundamental feature, evident from the previous description, of avoiding the use of labour in any stage of producing the bead core and relative filler assembly both in the phase of loading the bead core, applying the filler to the bead core and unloading and transporting the final assembly.

In addition, the preferred solution described has the advantage of leaving the overall dimensions of the applicators unchanged: in fact, the means of loading the bead cores and unloading the bead cores with the filler only have angular movements in one plane of jaws 17 and 18 from a position A beneath the discs to position B between the discs and vice versa from B to A (see FIGS. 1 to 4).

Therefore, the installation of the discs or similar elements, already envisaged in other solutions, is not subject to substantial modifications, with evident economic advantages.

Although the present invention has been described here in a particularly advantageous embodiment, it should be noted that the protective scope of this patent includes all the variations accessible to engineers of the art and derived from the inventive principles described here.

What is claimed is:

1. Device for applying an elastomeric filler on the bead core of a tire, consisting of two discs with a common axis of rotation, which can be moved away from each other or brought together respectively to receive the bead core before the application of the filler and to unload the bead core with the filler and to form an annular seat designed to accommodate the bead core, the said device being characterised by the fact that it includes means for automatically loading the bead core from a first position to a second position in which the bead core is between the two discs with its center aligned with the common axis of rotation, the said means having two jaws and means for controlling the opening of the jaws, the said two jaws rotating in relation to each other round a first hinge arranged on a suitable support rotating around a second hinge in order to bring the jaws from the first of the said positions to the second and vice versa, the said two hinges having axis of rotation parallel to the common axis of rotation of the two discs, the profile of the jaws when closed having surfaces corresponding to circle arcs of the radial profile of the bead core, the said surfaces of the jaws being provided with means for connecting to the corresponding parts of the radially outermost periphery of the bead core, the said means for controlling the opening of the jaws being actuated when the bead core had already been locked in the annular seat between the two discs and the support is moved from the second of these positions to the first, and said means for controlling the opening of the jaws having an element for controlling the rotation of the first jaw, the path of which from the second of these positions to the first meets the external profile of the bead core, the said first jaw rotating around the first hinge and in relation to the second jaw kept stationary on the said support.

2. Device in accordance with claim 1, characterised by the fact that the profile of the jaws is subdivided into at least three circle arcs of the bead core, having, from the start to the end of the three arcs, an angle at the center of less than or at the most equal to 180°.

3. Device in accordance with claim 1 or 2, characterised by the fact that the said control element is elastic and keeps the profile of the first jaw in sprung contact with the bead core during the movement of the support from the second of the said positions to the first.

4. Device in accordance with claim 3, characterised by the fact that the said elastic element is a helicoidal spring fitted between two suitable extensions of the two jaws.

5. Device in accordance with claim 3, characterised by the fact that one part of the surface of the first jaw abuts on a corresponding shoulder on the surface of the second jaw, the said shoulder opposing the complete rotation of the first jaw under the effect of the elastic element and maintaining the two jaws in a suitable position to receive the bead core.

6. Device in accordance with claim 1 or 2, characterised by the fact that the hinge of the jaws, the hinge of the jaw support and the center of the bead core between the jaws are aligned.

7. Device in accordance with claim 1 or 2, characterised by the fact that the said support consists of the second jaw.

8. Device in accordance with claim 1 or 2, characterised by the fact that the said means of connecting of the surfaces of the jaws consist of magnets.

9. Device in accordance with claim 1 or 2, characterised by the fact that the respective upper external surfaces of the two jaws create an inclined surface on which the bead core with the filler rolls when the two jaws are in the first of the said positions and the two discs have moved away from each other to unload the bead core with the filler.

10. Device in accordance with claim 1 or 2, characterised by the fact that the plane for loading the bead core from the first to the second of these positions, the central plane of rotation of the bead core between the rotating discs and the plane for unloading the bead core with the filler, coincide.

11. Device in accordance with claim 1 or 2, characterised by the fact that the two jaws in the said two positions and in the movement between the two positions are contained between two guiding and containing walls and each edge of the jaws is less than 4 mm away from the relative wall.

12. Device in accordance with claim 1 or 2, characterised by the fact that it has a first transport system for a plurality of bead cores and a second transport system for a plurality of bead cores already attached to the relative fillers, the said two systems having means for feeding the bead cores with their centres aligned in a direction parallel to the common axis of rotation of the two discs of the device, the said first system having means for distributing the bead cores towards the two jaws in the first of the two positions mentioned.

13. Device in accordance with claim 12, characterised by the fact that the said distribution means have a roller rotating around an axis parallel to the axis of the bead cores in movement with the first transport system, the said roller being entrained in rotation and brought into contact with the periphery of a bead core by a suitable control device.

14. Device in accordance with claim 13, characterised by the fact that the said roller control device has a lever, a cylinder with relative piston, a roller power unit, the said lever has a first end hinge mounted on the appropriate frame, a second end connected to the power unit, a point between the two ends connected to the piston which slides in the cylinder attached to the frame, the said power unit having a mechanism for transmitting the rotation movement to the said roller.

15. Device in accordance with claim 1 or 2, characterised by the fact that it is suitable for the formation of an elastomeric filler around a bead core for a vehicle tire, the said bead core having sides of 6×6 mm.

16. Device in accordance with claim 1 or 2, characterised by the fact that it has means, operating continuously and automatically, for cutting a strip of filler to a length equal to the bead core, means for applying the said strip to the bead core in a manner in which the two opposite ends of the filler are radially open outwards, means for welding the said two ends together.

17. Device in accordance with claim 3 characterized by the fact that the hinge of the jaws, the hinge of the jaw support and the center of the bead core between the jaws are aligned.

18. Device in accordance with claim 6 characterized by the fact that the said support is a second jaw.

19. Device in accordance with claim 3 characterized by the fact that the said support is a second jaw.

20. Device in accordance with claim 3 wherein the said connecting means is a magnet.

21. Device in accordance with claim 6 wherein the upper external surfaces of the two jaws create an inclined surface on which the bead core with the filler rolls when the two jaws are in the first of the said positions and the two discs have moved away from each other to unload the bead core with the filler.

* * * * *